US006228238B1

(12) United States Patent
Kuragaki

(10) Patent No.: US 6,228,238 B1
(45) Date of Patent: May 8, 2001

(54) OUTSIDE POWER SOURCE-TYPE, ELECTRICAL, CORROSION PROTECTION

(75) Inventor: Naoyoshi Kuragaki, Hamamatsi (JP)

(73) Assignee: Yamaha Hatsudoki Kabushiki Kaisha, Iwata (JP)

(*) Notice: Subject to any disclaimer, the term of this patent is extended or adjusted under 35 U.S.C. 154(b) by 0 days.

(21) Appl. No.: 08/259,933

(22) Filed: Jun. 13, 1994

Related U.S. Application Data

(63) Continuation of application No. 07/966,285, filed on Oct. 26, 1992, now abandoned.

(30) Foreign Application Priority Data

Oct. 26, 1991 (JP) .................................................. 3-306939

(51) Int. Cl.[7] ............................ C23F 13/00; G01N 27/31

(52) U.S. Cl. ............... 204/435; 204/196.02; 204/196.06; 204/196.37; 205/725; 205/740

(58) Field of Search .................................... 204/147, 148, 204/196, 197, 435

(56) References Cited

U.S. PATENT DOCUMENTS

| | | | |
|---|---|---|---|
| 2,910,420 | * | 10/1959 | Preiser . |
| 3,360,452 | * | 12/1967 | McNulty . |
| 3,438,875 | * | 4/1969 | Watanabe et al. . |
| 3,455,793 | * | 7/1969 | Watanabe et al. . |
| 3,625,851 | * | 12/1971 | Geld . |
| 4,163,698 | * | 8/1979 | Kuo et al. . |
| 4,171,254 | * | 10/1979 | Koenecke . |
| 4,290,872 | * | 9/1981 | Monter et al. . |
| 4,492,877 | | 1/1985 | Staerzl . |
| 4,500,402 | * | 2/1985 | Miles et al. . |

* cited by examiner

*Primary Examiner*—T. Tung

(74) *Attorney, Agent, or Firm*—Knobbe, Martens, Olson & Bear, LLP

(57) ABSTRACT

Several embodiments of reference electrode constructions for use in electrically anti-corrosion protection systems for marine outboard drives. In each embodiment the reference electrode is contained within a protective covering with a restricted small volume area surrounding the reference electrode. As a result, when the reference electrode dissolves in the body of water in which it is operating it will form a saturated solution in this small volume area to preclude further dissolution.

14 Claims, 7 Drawing Sheets

$\Delta V = V_0 - V_R$ Reference Potential

OUTSIDE POWER SOURCE-TYPE, ELECTRICAL, CORROSION PROTECTION

This application is a continuation of application Ser. No. 07/966,285, filed Oct. 26, 1992, now abandoned.

BACKGROUND OF THE INVENTION

This invention relates to a cathodic corrosion prevention system for a marine outboard drive and more particularly to an improved device of this type that embodies electrical power supply for maintaining a pre-determined potential on the marine outboard drive to assist in the cathodic protection.

Marine outboard drives in the forms of outboard motors or the outboard drive portion of an inboard/outboard drive arrangement normally employ outer housings made of light weight alloy such as aluminum alloys or the like. In addition, however, such outboard drives also embody other metals and the resulting difference in metals can give rise to galvanic corrosion of the metal higher on the activity chart.

A variety of electrical protection arrangements have been employed for such outboard drives wherein the outboard drive is supplied with electrical power so as to maintain a desired electrical potential on the outboard drive so as to limit this corrosion. This is done by applying a direct current power source to the outboard drive and to an electrode which is mounted in a spaced position from the outboard drive so as to maintain the desired potential on the outboard drive. The electrode is supplied with current at an amount determined by a reference electrode which, preferably, is mounted in close relationship to the power electrode and spaced substantially at the same distance from the outboard drive as the power electrode so as to maintain the proper current depending upon the nature of the water (fresh or salt) in which the watercraft is operating. These systems can be quite effective.

One disadvantage with this type of system, however, is that the reference electrode will itself deteriorate and dissolve in the body of water in which the watercraft is operating and this will change its signal and can adversely effect the performance of the protection system. In addition, the reference electrode, which normally is formed from a small piece of wire, must be protected from damage by underwater objects.

It is therefore, a principal object to this invention to provide an improved outside power source-type of electrical corrosion protection system for a marine outboard drive.

It is a further object to this invention to provide an improved reference electrode arrangement for such a system wherein it is insured that the reference electrode will have a long life and provide a uniform and consistent signal throughout its life.

SUMMARY OF THE INVENTION

The invention is adapted to be embodied in a reference electrode construction for an electrically powered marine propulsion corrosion protection system. The reference electrode is comprised of an electrode portion and a surrounding protective covering at least partially enclosing the electrode portion and defining a relatively small air volume area therebetween sufficient that the dissolution of the electrode portion in the body of water in which the electrode is immersed will produce a saturated solution for substantially reducing further dissolution of the reference electrode portion. Means are provided for admitting water into the small volume so the reference electrode portion will sense the condition of the water.

DETAILED DESCRIPTION OF THE PREFERRED EMBODIMENTS OF THE INVENTION

Figure 1:
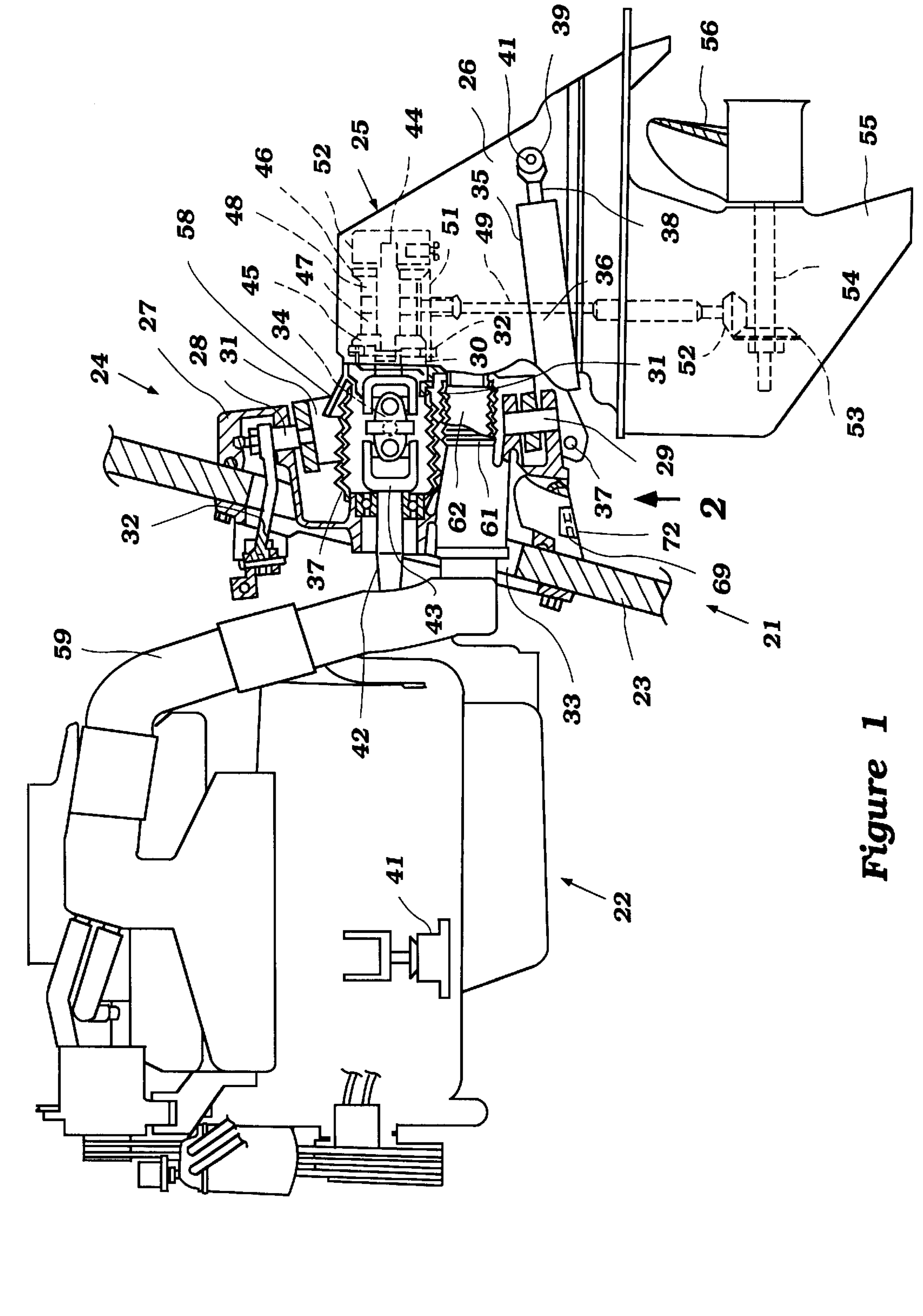
FIG. 1 is a side elevational view of a marine propulsion device having a protection system constructed in accordance with an embodiment of the invention.
Figure 2:
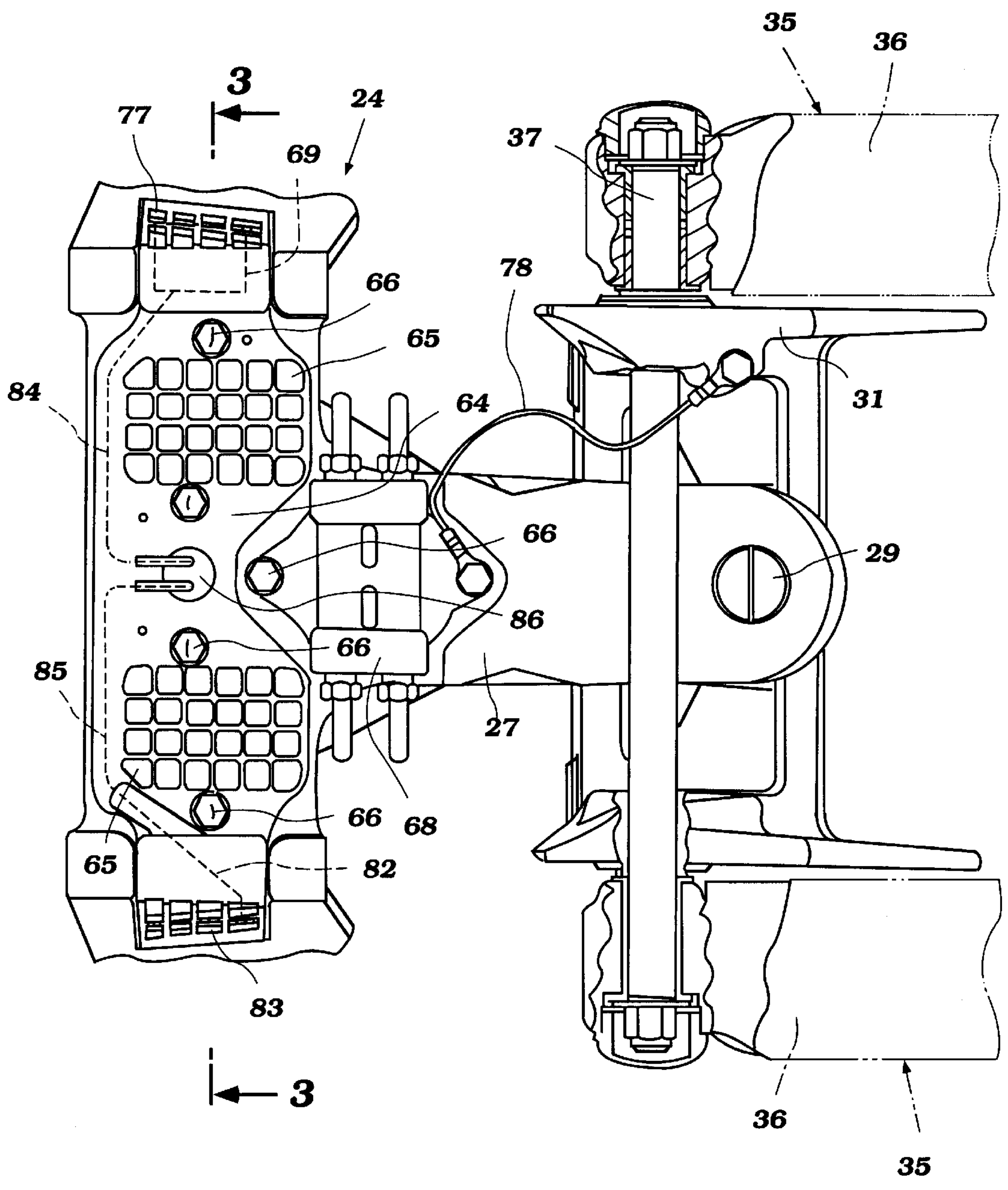
FIG. 2 is an enlarged bottom plan view taken generally in the direction of the arrow 2 in FIG. 1 and shows certain portions broken away.
Figure 3:
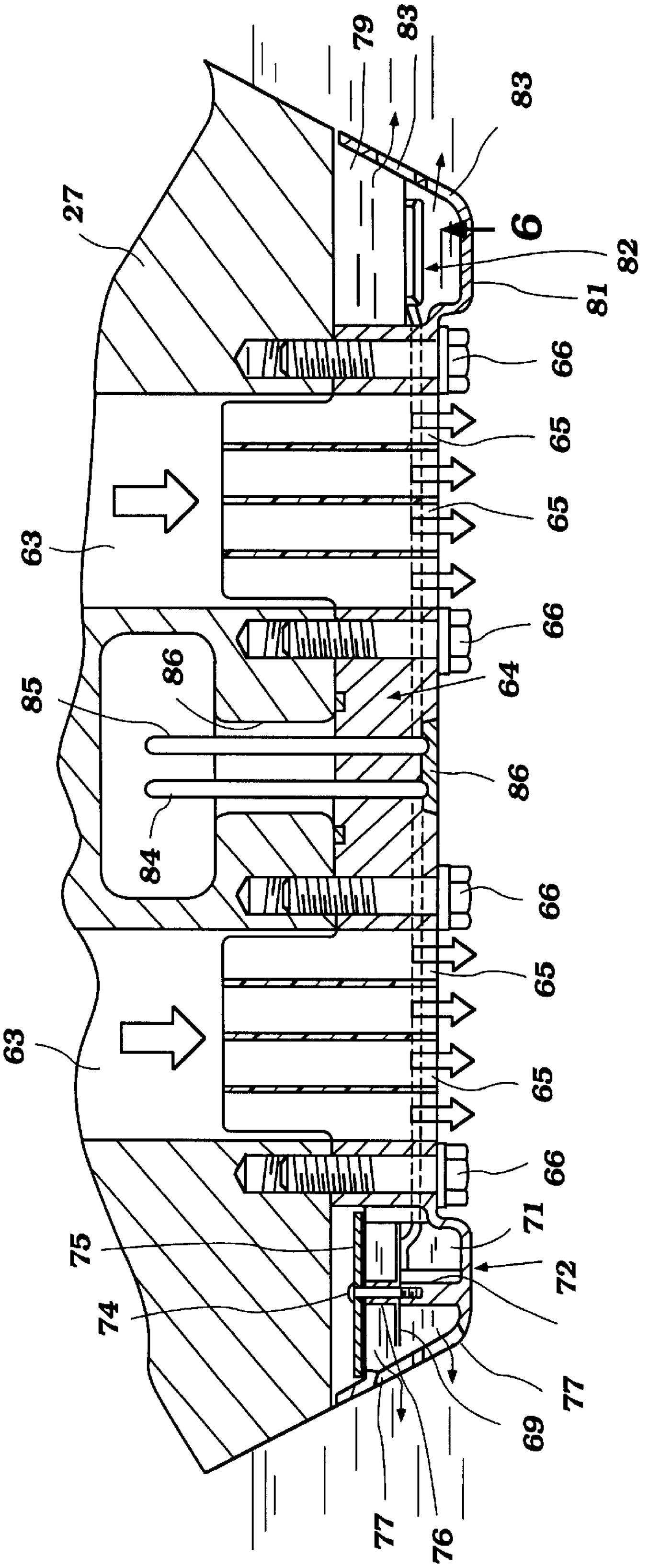
FIG. 3 is a further enlarged cross sectional view taken along the line 3—3 of FIG. 2.

Referring first to FIGS. 1 through 3, a marine outboard drive constructed in accordance with an embodiment of the invention is identified generally by the reference numeral 21. In the illustrated embodiment, the outboard drive 21 is of the inboard/outboard type and includes an internal combustion engine 22 of any known type which is mounted within the hull of an associated watercraft and forwardly of the transom, indicating generally by the reference numeral 23. In addition, an outboard drive portion, indicated generally by the reference numeral 24 is mounted on the rear of the transom 23 and includes an outboard drive unit 25 having an outer housing 26 formed from a light weight relatively highly electrically active metal such as aluminum alloy or the like.

A gimble housing 27 is affixed to the rear side of the transom 23 in a known manner and supports a pair of vertically extending pivot shafts 28 and 29 which provide a pivotal connection to a gimble ring 31. This pivotal connection permits steering of the gimble ring 31 about a steering axis defined by the pivot shafts 28 and 29. A steering arm 32 is affixed to the upper pivot shaft 28 and extends through an opening 33 in the transom 23 for connection to a steering mechanism of the watercraft, in a well known manner.

The outboard drive housing 26 is pivotally connected to the gimble ring 31 for pivotal movement about a horizontally extending axis for tilt and trim movement by means of a pair of horizontally extending pivot shafts 34. This tilt and trim movement is controlled by means of a pair of hydraulic fluid motors 35 powered by a power source mounted within the hull of the watercraft. The hydraulic fluid motors 35 include cylinder assemblies 36 that are pivotally connected by means of pivot pins 37 to the gimble ring 31. These assemblies 36 further include internal pistons (not shown) which are connected to piston rods 38 which extend through the rear ends of the housings 26 and have trunnion portions 39 for a pivotal connection by means of pivot pins 41 to the housing 26 in a well known manner.

As has been previously noted, the engine 22 is mounted within the hull of the watercraft in any suitable manner, for example by means of resilient engine mounts 41. The engine 22 has an output shaft 42 that extends through the transom opening 33 and which has a universal joint 43 affixed to its rear end. The universal joint 43 drives an input shaft 44 of the outboard drive unit 25 that is supported for rotation about a horizontally extending axis within its housing 26 in a suitable manner. A pair of bevel gears 45 and 46 are mounted on the shaft 44 and can be coupled thereto by means of respective clutches 47 and 48 for selectively driving a vertically extending drive shaft 49 in forward or reverse directions. A bevel gear 51 is affixed to the upper end of this drive shaft 49 and is engaged with the driving bevel gears 45 and 46.

The clutches 47 and 48 may be engaged either manually or hydraulically by means of a hydraulic system, indicated generally by the reference numeral 52 and of a type described in the copending application entitled "Power Transmission For An Inboard/Outboard Motor", Ser. No. 770,607, filed Oct. 3, 1991.

A bevel gear 52 is affixed to the lower end of the draft shaft 49 and drives a bevel gear 53 that is fixed to a propeller shaft 54 journaled in a lower unit 55 of the outboard drive unit 25 onto which a propeller 56 is affixed for propelling the associated watercraft in a selected forwardly or reverse direction, as is well known in this art.

A flexible boot 57 encircles the universal joint 43 and is affixed to the gimble housing 27 and housing 26 so as to provide a seal around this joint. A housing piece 58 is affixed to the housing 26 and extends over the protective boot 57. This arrangement permits the tilt and trim movement of the outboard drive unit 25.

The engine 22 is provided with an exhaust system that includes an exhaust manifold and Y-pipe 59 which extends down through the opening 33 in the transom 23 and which has an end portion 61 that is encircled by a flexible bellow 62 for delivering the exhaust gases to the housing 26 for discharge under high speeds through an under water through the propeller hub exhaust gas discharge of any known type. In addition, the system may be provided with an above-the-water low speed exhaust gas discharge of the type generally shown in U.S. Pat. No. 4,957,461, entitled "Idling Noise Silencer For Marine Propulsion Unit ", issued Sep. 18, 1992 and assigned to the Assignee hereof.

This discharge includes a pair of downwardly facing, low speed exhaust gas discharge passages 63 (FIG. 3) positioned in the lower surface of the gimble housing 27. A non-metallic, insulating mounting assembly, indicated generally by the reference numeral 64, for a portion of the electrical corrosion protection system to be described, is mounted so that it forms a plurality of baffled openings 65 that communicate the passageways 63 with the body of water for silencing purposes and to break up the air particles. Mounting bolts 66 hold this mounting assembly 64 to the gimble housing 27. A fluid distributor assembly 68 is mounted rearwardly of the protection system including the mounting assembly 64 and supplies fluid to the fluid motors 35 for tilt and trim movement in a well known manner. The construction of the outboard drive 21 as thus far described may be considered to be conventional and reference may be had to the aforenoted co-pending application and issued patent for details of the construction.

The invention in this application, as has been noted, is directed toward the electrical corrosion protection system and this system will now be described by primary reference to FIGS. 1 through 5 initially. This protection system is of the type generally disclosed in my co-pending application entitled "Electrical Anti-Corrosion Device For Marine Propulsion Device ", Ser. No. 833,090, filed Feb. 10, 1992 and assigned to the Assignee hereof. That disclosure is incorporated herein by reference and includes a system that includes an anode 69 that is mounted within a cavity 71 formed as one side of the mounting block 64 outwardly of an adjacent one of the exhaust passages 63. This cavity is formed by an extension 72 of the mounting block 64 and has a boss 73 to which the anode 69 is affixed by means of a fastener 74. As noted the mounting block 64 is formed from a suitable non-electrically conductive materials such as a molded plastic and a plastic cover plate 75 is also affixed to the mounting boss 73 by the fastener 74 in spaced relationship to the anode 69 by means of a bushing 76 also formed from a plastic material. Water may freely enter the cavity 71 from the body of water in which the watercraft is operating through openings 77 so that the anode 69 will be in full electrical contact with the body of water in which the watercraft is operating.

It should be noted that the gimble housing 27 and gimble ring 31 are maintained in electrical contact with each other through a ground strap 78 (FIG. 2). A similar ground strap (not shown) connects the gimble ring 31 with the outer housing 26 of the outboard drive unit 25. Hence, all of the metal components will be in direct electrical connection with each other so as to maintain the substantially same electrical potential therebetween.

A further cavity 79 is formed by the housing block 64 by means of an outwardly extending portion 81 thereof which cavity 79 is positioned in directly opposed relationship to the cavity 71 so that there will be the same distance between the anode 69 and a reference electrode, indicated generally by the reference numeral 82 which is positioned within the cavity 79. This will insure effective operation of the system. A plurality of openings 83 afford water communication between the body of water in which the watercraft is operating and the cavity 79.

The anode 69 is connected to an electrical control system by means of a conductor 84 and the reference electrode 82 is also connected to this electrical system by a conductor 85. The conductors 84 and 85 extend through the block 64 and are sealed thereto by a sealing material 86. These conductors 84 and 85 then extend upwardly through an opening 86 formed in the gimble housing 27 for connection to the electrical circuit as shown in FIG. 4.

Figure 4:
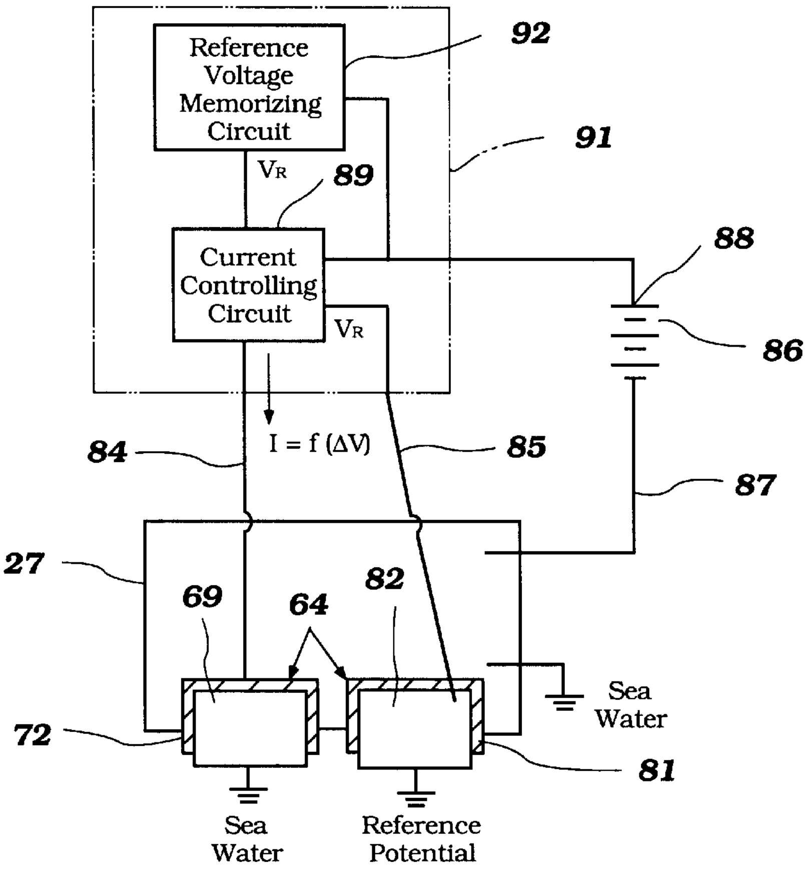
FIG. 4 is a schematic view showing the electrical components of the system and their interrelationship.
Figure 5:
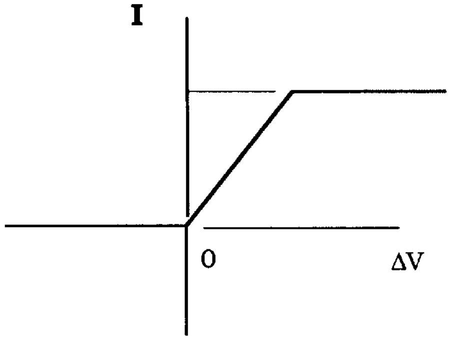
FIG. 5 is a graphically view showing the current necessary based upon reference voltage to provide the desired reference potential.

As may be seen in FIG. 4, the system is powered by a direct current electrical source such as a battery 86 which has its cathode or negative terminal connected by a conductor shown schematically at 87 to the outboard drive unit and specifically to the gimble housing 27 which, as has been noted, is electrically connected to the gimble ring 31 and outboard drive unit housing 26. The positive terminal or anode 88 of the battery 86 is connected to a current controlling circuit 89 which forms part of a control device, shown schematically by the block 91 and which also includes a reference voltage memorizing circuit 92 that outputs a voltage signal $V_O$ which is indicative of the pre-determined voltage difference necessary to provide the desired electrical potential for the electrically corrosion protection. As may be seen in FIG. 5, the current necessary to provide the necessary voltage differential $\Delta V$ is arrived at by subtracting the reference voltage $V_R$ from the necessary voltage $V_O$ to maintain the desired potential for corrosion protection.

The important feature of the invention in this application is the way in which the reference electrode 82 is protected from deterioration due to corrosion or the like. In this regard, it should be noted that the device is mounted outboard of the exhaust outlet opening 65 on both sides and hence the exhaust gases and their exit will not provide any deterioration in the signal nor will the exhaust gases cause any corrosion or chemical attack on the various electrodes. However, the reference electrode 82 may itself corrode or actually dissolve in the sea water and as the volume or mass of the reference electrode is thus depleted, the reference electrode will not provide an accurate reference signal and improper corrosion protection may result. In accordance with this invention, an arrangement is provided for protecting the reference electrode 82 from such corrosion or dissolution in the body of water in which the watercraft is operating and FIGS. 6 through 9 show one embodiment of a way in which this may be done.

The reference electrode 82 may be formed in any suitable manner. For example, a platinum wire may be sealed in a glass tube over which silver is electrically deposited using a high purity silver cyanate solution as an electrolyte. The coated silver is then used as anode and electricalized in a diluted hydrochloric acid to partially covert the silver into silver chloride. Of course, this is only one way in which the reference electrode may be formed.

Figure 6:
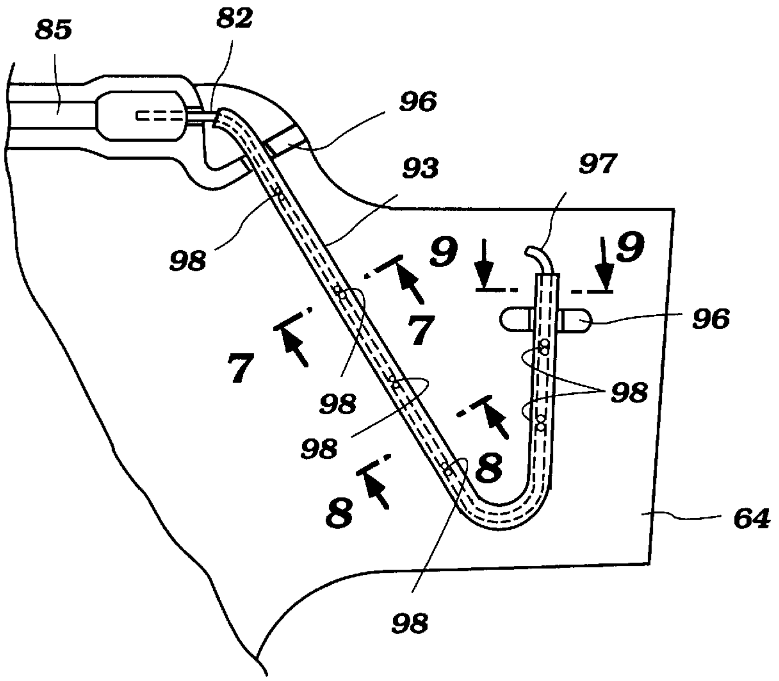
FIG. 6 is an enlarged view taken generally in the direction of the arrow 6 in FIG. 3 and shows the reference electrode and its protective system.
Figure 7:
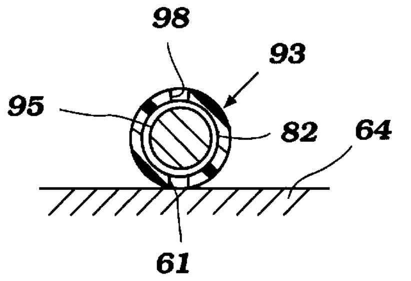
FIG. 7 is a further enlarged cross sectional view taken along line 7—7 of FIG. 6.
Figure 8:
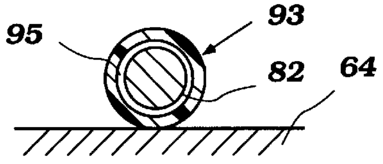
FIG. 8 is an enlarged cross sectional view taken along the line 8—8 of FIG. 6.
Figure 9:
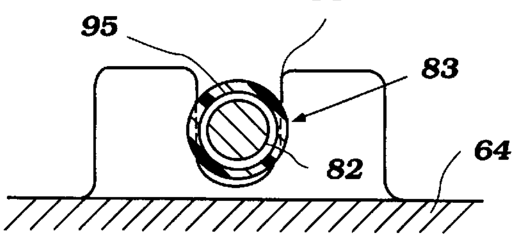
FIG. 9 is an enlarge cross sectional view taken along the line 9—9 of FIG. 6.
Figure 10:
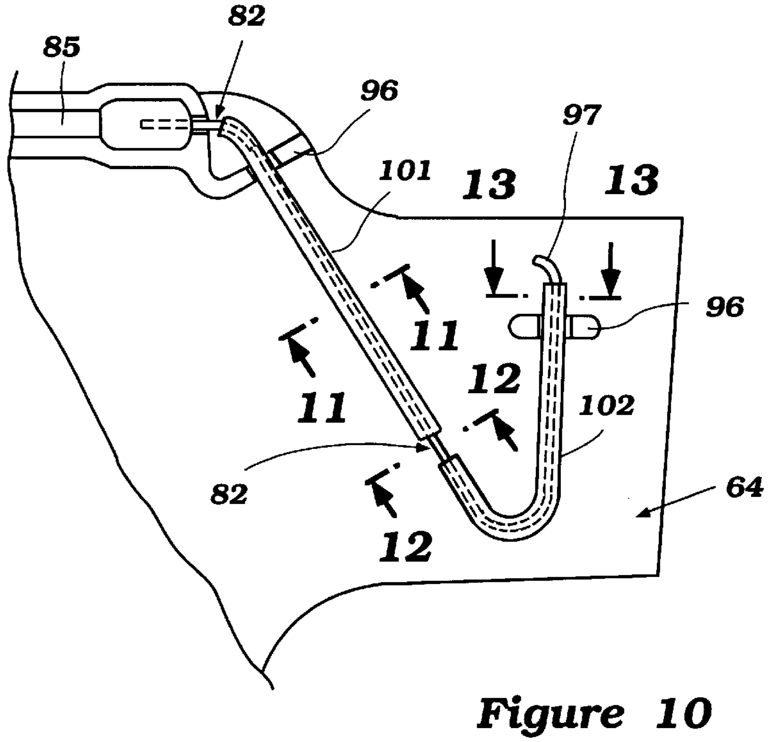
FIG. 10 is an enlarged bottom plan view, in part similar to FIG. 6, and shows another embodiment of the invention.
Figure 11:
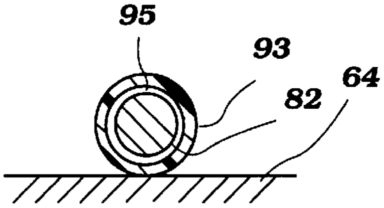
FIG. 11 is a further enlarged cross sectional view taken along the line 11—11 of FIG. 10.
Figure 12:
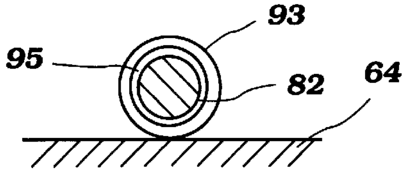
FIG. 12 is an enlarged cross sectional view taken along the line 12—12 of FIG. 10.

As may be seen in FIG. 6, the reference electrode from its connection to the conductor 85 has a generally V-shape. In accordance with the invention, portions of the reference electrode are contained within a protective tubular member 93 which may be formed from a plastic material in a tubular form with a gap 95 which comprises a volume around the contained portion of the reference electrode 82. The volume 95 is opened to the body of water through open ends so that certain portions of the reference electrode 82 are directly exposed to the body of water, as may be readily seen in FIG. 6, while the volume of water around the reference electrode 82 will be relatively stagnant. As a result of this, as the reference electrode 82 dissolves, a saturated solution will eventually be formed in the cavity 95 and further dissolution will be precluded.

Figure 13:
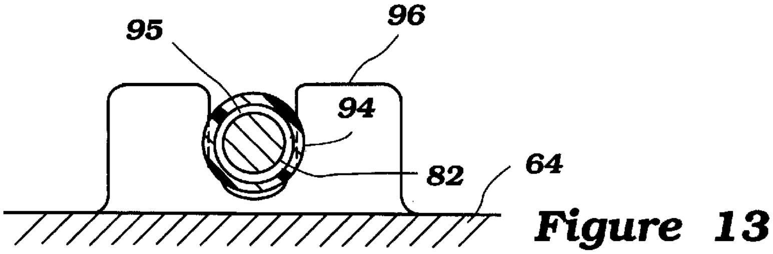
FIG. 13 is an enlarged cross sectional view taken along the line 13—13 of FIG. 10.

The protective covering 93 is maintained in the block 64 by forming grooves in upstanding projections 96 into which the protective covering is forced as may be seen in FIG. 13 so as to maintain the desired spacing. In addition, an exposed end 97 of the reference electrode 82 may be bent as seen in FIG. 6 so as to prevent the protective covering 93 from working off of the reference electrode. As a result of this construction, the reference electrode is well protected from more than minor dissolution and, at the same time, it is free to come into contact with the body of water so as to provide the reference signal needed for maintaining the good electrical protection.

In order to permit the portion of the volume 95 between the open ends of the protective covering 93 communicate with the body of water, a plurality of spaced apertures 98 are formed along the length of the protective covering 93. These openings 98 are small enough so that they will not create any true circulation through the volume 95 but will, nevertheless, permit sufficient water to enter so that the reference electrode 82 will sense the potential of the body of water in which the watercraft is operating.

FIGS. 10 through 13 show another embodiment of the invention which is generally the same as the embodiment thus far described. In this embodiment, rather than employing a plurality of apertures to permit the water to enter the volumes 95, the protective covering is split into a plurality of tubular segments 101 and 102 (two in this case). The tubular sections 101 and 102 are spaced from each other and thus provide a plurality of open ends along their length which serve the same purpose as the holes 98 and in the embodiment of FIGS. 6 through 9.

Figure 14:
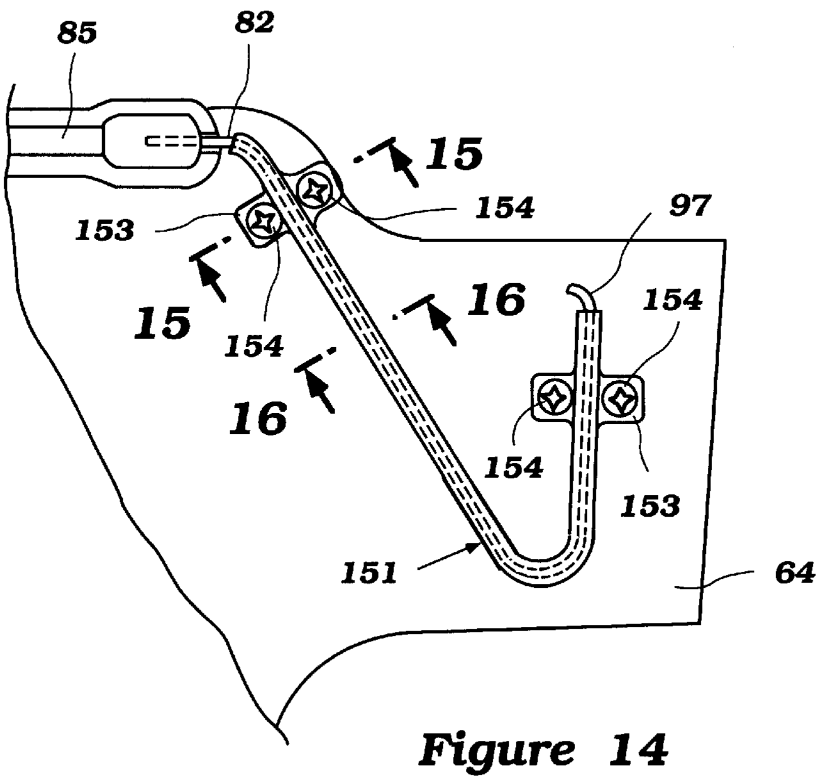
FIG. 14 is an enlarged bottom plan view, in part similar to FIGS. 6 and 10, and shows yet another embodiment of the invention.
Figure 15:
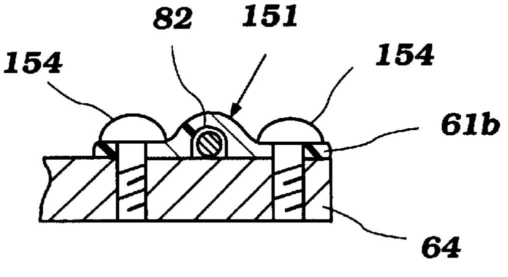
FIG. 15 is a cross sectional view taken along the line 15—15 of FIG. 14.
Figure 16:
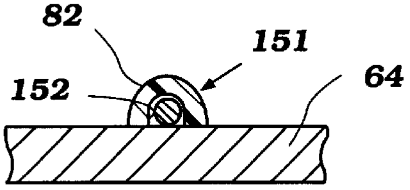
FIG. 16 is an enlarged cross sectional view taken along the line 16—16 of FIG. 14.

FIGS. 14 through 16 show another embodiment of the invention which is also similar to those previously described and, for that reason, components which are the same or substantially the same have been identified by the same reference numerals. In this embodiment, rather than a tubular member, a protective covering 151 is formed from a plastic material or the like and which has an arcuate recess 152 which encircles the contained portion of the reference electrode 82 and which provides the volume surrounding the reference electrode that permits the water to encircle or surround the reference electrode 82 but precludes any substantial flow so that a stagnant area will be present which will cause the dissolution of the reference electrode 82 to form a saturated solution. The protective covering 151 has a plurality of spaced flanges 153 that pass threaded fasteners 154 so as to affix the protective covering 151 to the mounting block 64. In this embodiment, the ends of the protective covering 151 are open as with the other embodiments so as to permit water to enter into the volume 152. If desired, this water entry may be further facilitated by providing spaced holes along the protective covering 151.

It should be readily apparent from the foregoing description that the described embodiments of the invention are extremely effective in providing good electrical corrosion protection for a marine outboard drive and one in which the reference electrode is protected from excess corrosion and dissolution while, at the same time, maintaining a good reference signal through the life of the unit. Of course, the foregoing description of the date is that of preferred embodiments of the invention and various changes and modifications may be made without departing from the spirit and scope of the invention, as defined by the appended claims.

What is claimed is:

1. A reference electrode construction for an electrically powered marine propulsion unit corrosion protection system, said reference electrode comprising an electrode wire having an outer surface formed of material which is soluble in a body of water in which said reference electrode is immersed, an elongated surrounding protective covering having a V-shaped portion at least partially enclosing a V-shaped section of said electrode wire and defining a small volume therebetween, said outer surface material of said electrode wire being sufficiently dissolvable in the volume of water between said protective covering and said electrode wire to produce a saturated solution of said outer surface material when said reference electrode is placed in the body of water, and a plurality of fluidic openings which open into said small volume defined between said electrode wire and said covering.

2. A reference electrode construction for an electrically powered marine propulsion unit corrosion protection system as set forth in claim 1 wherein the protective covering encases the electrode wire.

3. A reference electrode construction for an electrically powered marine propulsion unit corrosion protection system as set forth in claim 2 wherein the protective covering terminates short of the ends of the electrode wire to provide open ends through which water may be admitted to the small volume.

4. A reference electrode construction for an electrically powered marine propulsion unit corrosion protection system as set forth in claim 3, wherein there are a plurality of spaced segments of protective covering with exposed areas of the electrode wire being formed therebetween.

5. A reference electrode construction for an electrically powered marine propulsion unit corrosion protection system as set forth in claim 3, wherein said fluid openings comprise a plurality of holes formed in the protective covering.

6. A reference electrode construction for an electrically powered marine propulsion unit corrosion protection system as set forth in claim 2 wherein the protective covering is a tubular element.

7. A reference electrode construction for an electrically powered marine propulsion unit corrosion protection system as set forth in claim 6 wherein the protective covering terminates short of the ends of the electrode wire to provide open ends through which water may be admitted to the small volume.

8. A reference electrode construction for an electrically powered marine propulsion unit corrosion protection system as set forth in claim 7 wherein there are a plurality of spaced segments of protective covering with exposed areas of the electrode wire being formed therebetween.

9. The reference electrode construction for an electrically powered marine propulsion unit corrosion protection system as set forth in claim 6, wherein said fluidic openings comprise a plurality of holes formed in the protective covering.

10. A reference electrode construction for an electrically powered marine propulsion unit corrosion protection system as set forth in claim 9 wherein the protective covering terminates short of the ends of the electrode wire to provide open ends through which water may be admitted to the small volume.

11. A reference electrode construction for an electrically powered marine propulsion unit corrosion protection system as set forth in claim 2, wherein the protective covering includes a non-metallic electrical insulating member defining an elongated channel and affixed rigidly to a base with said electrode wire being disposed therebetween.

12. A reference electrode construction for an electrically powered marine propulsion unit corrosion protection system as set forth in claim 11 wherein the electrode wire extends beyond the ends of the protective covering and the ends of the protective covering are opened for forming said fluidic openings for admitting water to the small volume.

13. A reference electrode construction for an electrically powered marine propulsion unit corrosion protection system as set forth in claim 1, in combination with a marine outboard drive having an outer housing, said outer housing being in electrical communication with an electrical power source so as to function as a cathode, an anode electrode in communication with said power source and mounted adjacent to said reference electrodes and an electrical circuit for maintaining the desired potential between said anode electrode and said housing.

14. A reference electrode construction for an electrical corrosion protection system adapted for use with a marine propulsion unit, said reference electrode comprising an electrode wire having an outer surface of material that is soluble in a body of water in which said reference electrode is immersed, an elongated surrounding protective covering which encloses at least a portion of the electrode wire and defines a small space therebetween, said outer surface material of said electrode wire being sufficiently dissolvable in the volume of water between said protective covering and said electrode wire to produce a saturated solution of said outer surface material when said reference electrode is placed in the body of water, and a plurality of fluidic openings which open into the small space defined between said electrode wire and said covering.

* * * * *